United States Patent [19]

Hirata

[11] Patent Number: 5,265,025
[45] Date of Patent: Nov. 23, 1993

[54] NAVIGATION SYSTEM USING SATELLITE SIGNALS

[75] Inventor: Seiichiro Hirata, Sanda, Japan

[73] Assignee: Mitsubishi Denki Kabushiki Kaisha, Tokyo, Japan

[21] Appl. No.: 726,280

[22] Filed: Jul. 5, 1991

[30] Foreign Application Priority Data

Jul. 11, 1990 [JP] Japan .................. 2-186319

[51] Int. Cl.⁵ ............................. G06F 15/50
[52] U.S. Cl. .................... 364/449; 364/443; 342/450
[58] Field of Search ........... 364/449, 443, 444, 424.01, 364/453; 342/357, 450, 358; 73/178 R

[56] References Cited

U.S. PATENT DOCUMENTS

| | | | |
|---|---|---|---|
| 4,359,733 | 11/1982 | O'Neill | 364/449 |
| 4,899,285 | 2/1990 | Nakayama et al. | 364/453 |
| 4,903,212 | 2/1990 | Yokouchi et al. | 364/449 |
| 4,954,959 | 9/1990 | Moroto et al. | 364/449 |
| 5,075,693 | 12/1991 | McMillan et al. | 342/457 |
| 5,111,400 | 5/1992 | Yoder | 364/424.01 |
| 5,117,363 | 5/1992 | Akiyama et al. | 364/449 |

OTHER PUBLICATIONS

"NAVSTAR: Global Positioning System—Ten Years Later" IEEE, vol. 71, No. 10, Oct. 1983.

Primary Examiner—Thomas G. Black

[57] ABSTRACT

The navigation system using GPS signals from satellites first checks whether or not there are four or more satellites in radio range of the moving body. If so, the position calculation section performs an ordinary three-dimensional positioning operation to provide an accurate fix of the moving body. When the number of satellites within the radio range is three or less, the two-dimensional positioning operation is carried out, which comprises reading the previous altitude data from the altitude storage section; calculating the atmospheric pressure deviation from the atmospheric pressure sensor output as caused by the movement of the body; calculating the altitude deviation from the previous altitude data and the atmospheric pressure deviation; calculating the current altitude from the altitude deviation and the previous altitude data; and then calculating the two-dimensional position data from the GPS signals and the current altitude data. This method produces no errors which would otherwise be caused by changes in the altitude of the moving body but provides accurate two-dimensional fix data of the body.

4 Claims, 2 Drawing Sheets

NAVIGATION SYSTEM USING SATELLITE SIGNALS

BACKGROUND OF THE INVENTION

1. Field of the Invention

The present invention relates to a navigation system or global positioning system and more particularly to a vehicle navigation system that determines a vehicle position using radio signals from three satellites.

2. Description of the Prior Art

A navigation system or global positioning system which determines the position of a moving vehicle from radio signals of satellites is already in service. This global positioning system receives radio signals from a plurality of satellites and calculates the absolute position of a moving body anywhere on Earth to within 100 meters. To obtain two-dimensional position data (longitude and latitude) with sufficiently high accuracy, it is necessary to receive radio signals from four or more satellites at all times. When the number of satellites that are in radio range of the moving body decreases below four, the altitude cannot be determined, giving rise to an error in the two-dimensional position data. Hence, when only three or less satellites are in radio range, the previous altitude data was used to produce the two-dimensional position data. In this case, however, if the moving body has changed its altitude, an error still occurs in the two-dimensional position data.

With the conventional global positioning system, it is possible to produce accurate longitude and latitude data of a moving body when radio signals can be received from four satellites. But when the number of satellites in radio range of the moving body is less than four, errors will inevitably occur in the two-dimensional position data.

SUMMARY OF THE INVENTION

The present invention has been accomplished to overcome the above-mentioned drawback and to provide a global positioning system which can produce accurate two-dimensional position data even when the number of satellites in the radio range is three or less.

To achieve the above objective, a navigation system using satellite radio signals according to this invention comprises: a GPS receiver section for receiving GPS (global positioning system) signals from satellites; a decision section which, according to the received GPS signals, checks whether the number of satellites in radio range of the moving vehicle is four or more; an atmospheric pressure sensor for measuring the atmospheric pressure at the location of the moving body; an altitude deviation calculation section which calculates from the output of the atmospheric pressure sensor the atmospheric pressure deviation produced as a result of the movement of the body and determines the altitude deviation of the moving body from the atmospheric pressure deviation; an altitude storage section for storing the altitude data of the moving body; and a position calculation section which, when the number of satellites is four or more, calculates two-dimensional position data of the moving body from the GPS signals and the altitude data based on the GPS signals and which, when the satellite number is three or less, uses the previous altitude data and the altitude deviation to calculate new altitude data and then calculates two-dimensional position data from the new altitude data and the GPS signals.

In this invention, when four or more satellites are in the radio range, the vehicle navigation system or global positioning system calculates the two-dimensional position data of the moving body from the GPS signals received from the satellites and from the altitude data based on the GPS signals. When the number of satellites in the radio range is three or less, the system calculates the current altitude data from the previous altitude data and the altitude deviation, and then calculates the two-dimensional position data of the moving body by using the current altitude data thus obtained and the GPS signals.

DETAILED DESCRIPTION OF PREFERRED EMBODIMENT

Figure 1:
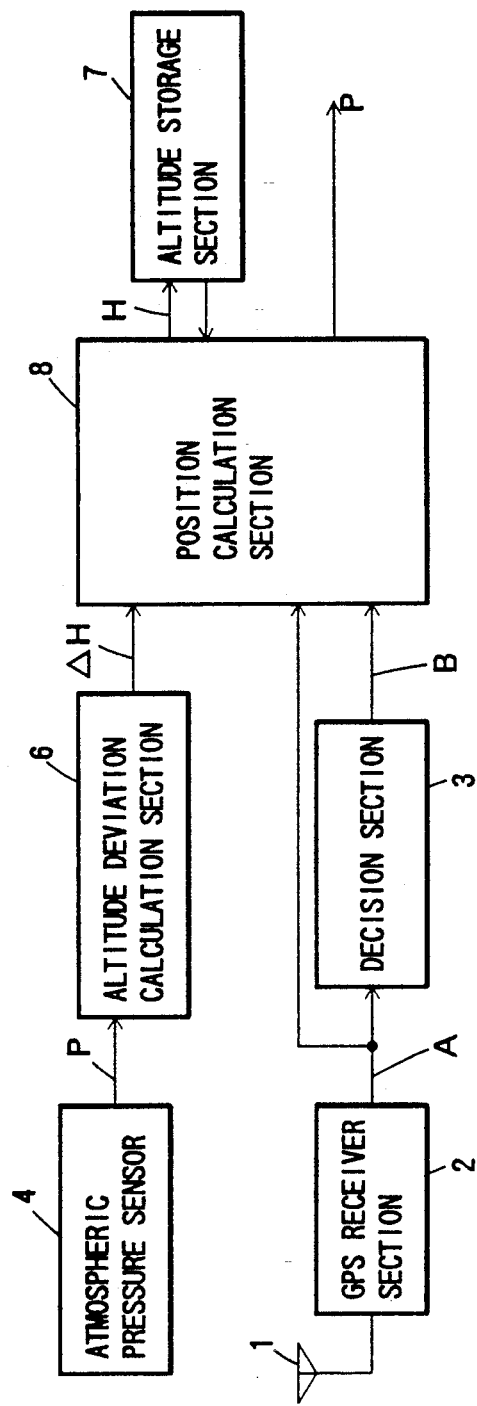
FIG. 1 is a functional block diagram of the navigation system of this invention.

One embodiment of this invention will be described by referring to the attached drawings. FIG. 1 is a functional block diagram of the vehicle navigation system as one embodiment of this invention. Reference numeral 1 represents an antenna to receive GPS signals from satellites; 2 a GPS receiver section that outputs the received GPS signals A; 3 a decision section that checks if the number of satellites in the radio range of the moving vehicle is four or more and, according to this decision, produces a control signal B; 4 an atmospheric pressure sensor that measures the atmospheric pressure P at the location of the moving body (on which the GPS receiver is mounted); 6 an altitude deviation calculation section that calculates an altitude deviation $\Delta H$ from an atmospheric pressure deviation that occurs as the body moves; 7 an altitude storage section that stores the previous altitude data H already determined; and 8 a position calculation section that, according to the GPS signals A, produces two-dimensional position data p defining the absolute position of the moving body, i.e. longitude and latitude of the body. When the control signal B shows the number of satellites in the radio range N to be four or more, the position calculation section 8 calculates the two-dimensional position data by using only the GPS signals A. When the satellite number N is three or less, the position calculation section 8 calculates the two-dimensional fix data by using the GPS signals A, the altitude deviation $\Delta H$ and the previous altitude data H.

The decision section 3, the altitude deviation calculation section 6, the altitude storage section 7 and the position calculation section 8 may be formed by a CPU.

Figure 2:
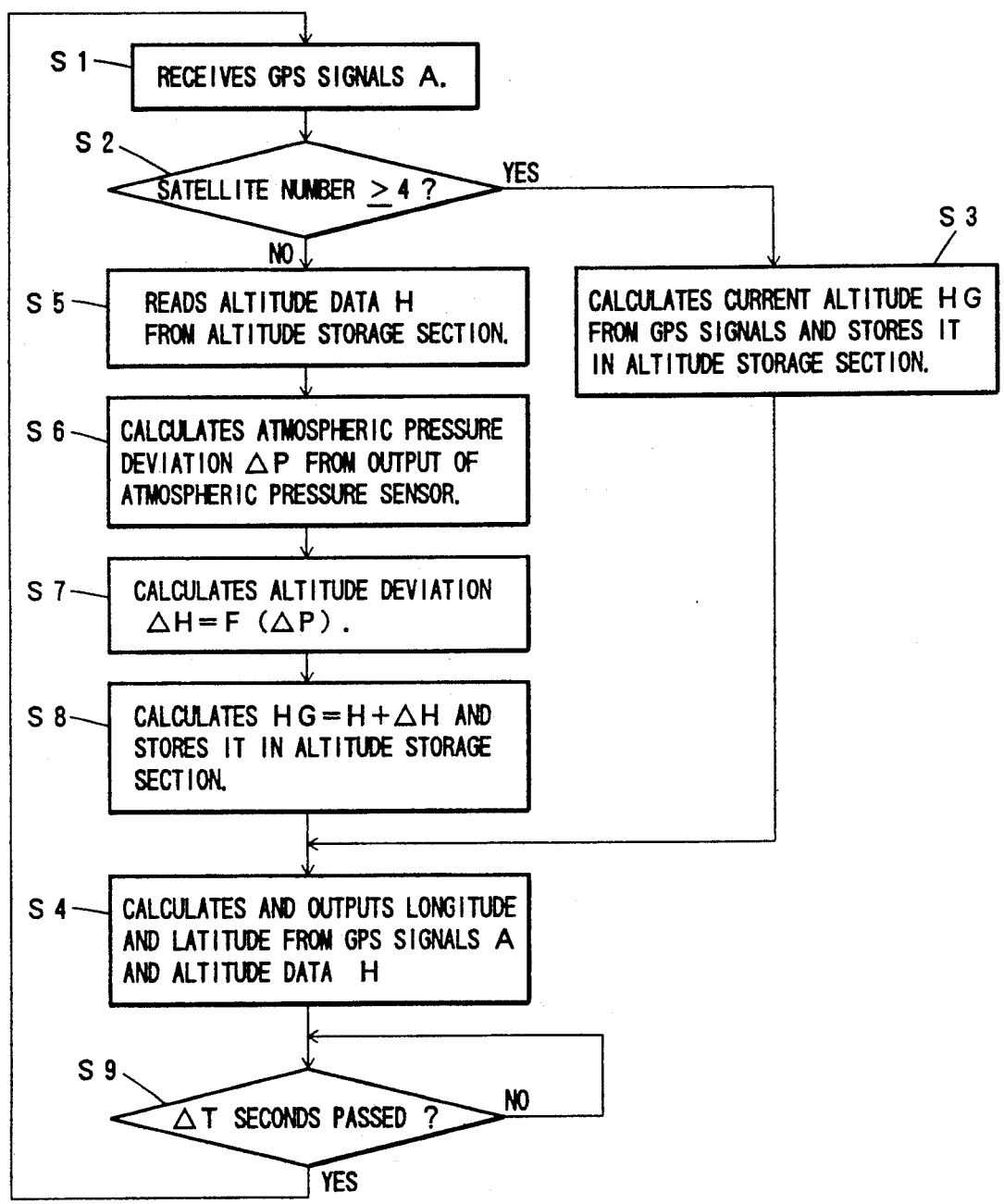
FIG. 2 is a flowchart showing the sequence of operation of the navigation system of the invention.

Next, the operation of the above system will be explained by referring to the flowchart of FIG. 2. First, at step S1, the GPS signals A contained in the radio signals from the satellites are received through the antenna 1 and the GPS receiver section 2. At step S2, the decision section 3 decides according to the GPS signals A received whether the number of satellites N is four or more ($N \geq 4$) and outputs the control signal B to the position calculation section 8. When the satellite number N is four or more, the position calculation section 8 performs a normal three-dimensional positioning operation based only on the GPS signals A. That is, at step S3 it calculates the current altitude $H_g$ from the GPS signals A and stores the calculated altitude data H in the altitude storage section 7; and at step 4 it calculates from the altitude data H and the GPS signals A the two-dimensional position data p made up of the latitude and longitude and then outputs that data.

When the step S2 decides that the number of satellites N is three or less (N≦3), the position calculation section 8 in response to the control signal B, which indicates the satellite number, performs the two-dimensional positioning operation based on the GPS signals A. That is, at step S5 the position calculation section 8 reads the previous altitude data H from the altitude storage section 7. At step S6 the altitude deviation calculation section 6 calculates from the output of the atmospheric pressure sensor 4 the atmospheric pressure deviation $\Delta P$ that is produced as the body moves and at step S7 the section 6 determines the altitude deviation $\Delta H = F(\Delta P)$. At step S8 the current altitude $H_G = H + H\Delta H$ is calculated from the altitude deviation $\Delta H$ and the altitude data H, and the calculated value is stored as the altitude data H in the altitude storage section 7. At step S4 the GPS signals A and the altitude data H are used to calculate and output the two-dimensional position data p. At the final step S9, the position calculation section 8 checks whether a predetermined time $\Delta T$ (seconds) has elapsed. With the predetermined time $\Delta T$ passed, the operation returns to the step S1 to repeat the above sequence from step S1 to step S9.

The advantages of this invention may be summarized as follows. When the number of satellites in radio range of the moving body is three or less, the present altitude data is calculated from the previous altitude data and the altitude deviation produced as a result of the vehicle movement. The present altitude data and the GPS signals are used to calculate the two-dimensional position data of the moving body. This method does not produce an error which would otherwise be caused by changes in the altitude of the moving body and therefore can provide accurate two-dimensional fix data of the moving body.

What is claimed is:

1. A navigation system using satellite radio signals comprising:
   a GPS receiver station for receiving global positioning system (GPS) signals from a plurality satellites;
   decision means for determining if a number of the plurality of satellites in radio range of a moving body is four or more;
   an atmospheric pressure sensor for measuring atmospheric pressure at a location of the moving body;
   an altitude deviation calculating section for calculating an atmospheric pressure deviation produced by movement of the moving body from the measured atmospheric pressure and for determining an altitude deviation of the moving body from the calculated atmospheric pressure deviation;
   an altitude storage section for storing altitude data of the moving body; and
   position calculating means for calculating two-dimensional position data of the moving body from the GPS signals and altitude data based on the GPS signals when the number of the plurality of satellites is four or more and for calculating the two-dimensional position data of the moving body from the GPS signals, stored altitude data, and the altitude deviation when the number of plurality of satellites is three or less.

2. A navigation system, comprising:
   GPS receiving means for receiving GPS signals, including altitude information, from a plurality of satellites;
   determining means for determining if a number of the plurality of satellites is greater than three;
   storing means for storing the altitude information;
   atmospheric pressure sensor means for measuring atmospheric pressure; and
   altitude deviation calculating means for calculating an altitude deviation from a deviation in the measure atmospheric pressure;
   position calculating means for calculating two-dimensional position data from the GPS signals, including the altitude information, when the number of satellites is greater than three and for calculating the two-dimensional position data from the GPS signals, the stored altitude information, and the altitude deviation when the number of satellites is less than or equal to three.

3. The navigation system of claim 2, wherein the altitude deviation and the stored altitude information are added to produce current altitude information.

4. The navigation system of claim 3, wherein the stored altitude information is previous altitude information.

* * * * *